United States Patent
Robertsson et al.

(10) Patent No.: US 12,034,563 B2
(45) Date of Patent: Jul. 9, 2024

(54) METHODS AND SYSTEMS FOR CONTROLLING AN ELECTRONIC DEVICE IN A SMART HOME SYSTEM

(71) Applicant: Inter IKEA Systems B.V., LN Delft (NL)

(72) Inventors: Per-Ola Robertsson, Furulund (SE); Jonas Söderqvist, Älmhult (SE); Tony Gjerlufsen, Copenhagen (DK); Ed Cutting, Hawthron East (AU); Tin Nguyen, Princes Hill (AU)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 17/852,505

(22) Filed: Jun. 29, 2022

(65) Prior Publication Data
US 2023/0006855 A1    Jan. 5, 2023

(30) Foreign Application Priority Data

Jul. 1, 2021    (EP) .................................... 21183224

(51) Int. Cl.
*H04L 12/28*    (2006.01)
*G06T 7/55*    (2017.01)

(52) U.S. Cl.
CPC .............. *H04L 12/282* (2013.01); *G06T 7/55* (2017.01); *H04L 12/2818* (2013.01); *H04L 12/2829* (2013.01)

(58) Field of Classification Search
CPC ............... H04L 12/282; H04L 12/2818; H04L 12/2829; H04L 2012/2841; H04L 12/2827; H04L 12/283; G06T 7/55
See application file for complete search history.

(56) References Cited

U.S. PATENT DOCUMENTS

| | | |
|---|---|---|
| 10,917,259 B1 | 2/2021 | Chein et al. |
| 2004/0003073 A1 | 1/2004 | Krzyzanowski et al. |
| 2016/0244011 A1* | 8/2016 | Ricci ..................... G06F 3/0673 |
| 2017/0005958 A1* | 1/2017 | Frenkel ................. G01S 5/0242 |
| 2019/0354227 A1* | 11/2019 | Mani ....................... G06F 3/017 |
| 2020/0279386 A1* | 9/2020 | da Veiga ................... G06T 7/55 |
| 2020/0382559 A1* | 12/2020 | Kramar ................. H04L 63/102 |
| 2020/0409532 A1* | 12/2020 | Murphy ............... G02B 27/017 |

FOREIGN PATENT DOCUMENTS

WO    2016/174662 A1    11/2016

OTHER PUBLICATIONS

European Search Report for EP Application No. 21183224.1 mailed Dec. 21, 2021 (7 pages).

* cited by examiner

*Primary Examiner* — Gil H. Lee
*Assistant Examiner* — Chhian (Amy) Ling
(74) *Attorney, Agent, or Firm* — Renner, Otto, Boisselle & Sklar, LLP

(57) ABSTRACT

A computer implemented method in a smart home system is provided. The method comprises defining, by sensing an indoor position of a wearable electronic device comprising an indoor positioning module, an area in a real-world indoor environment, and attributing a rule to the defined area, the rule comprising one or more settings to be applied to one or more electronic devices upon a user being detected in the defined area.

15 Claims, 10 Drawing Sheets

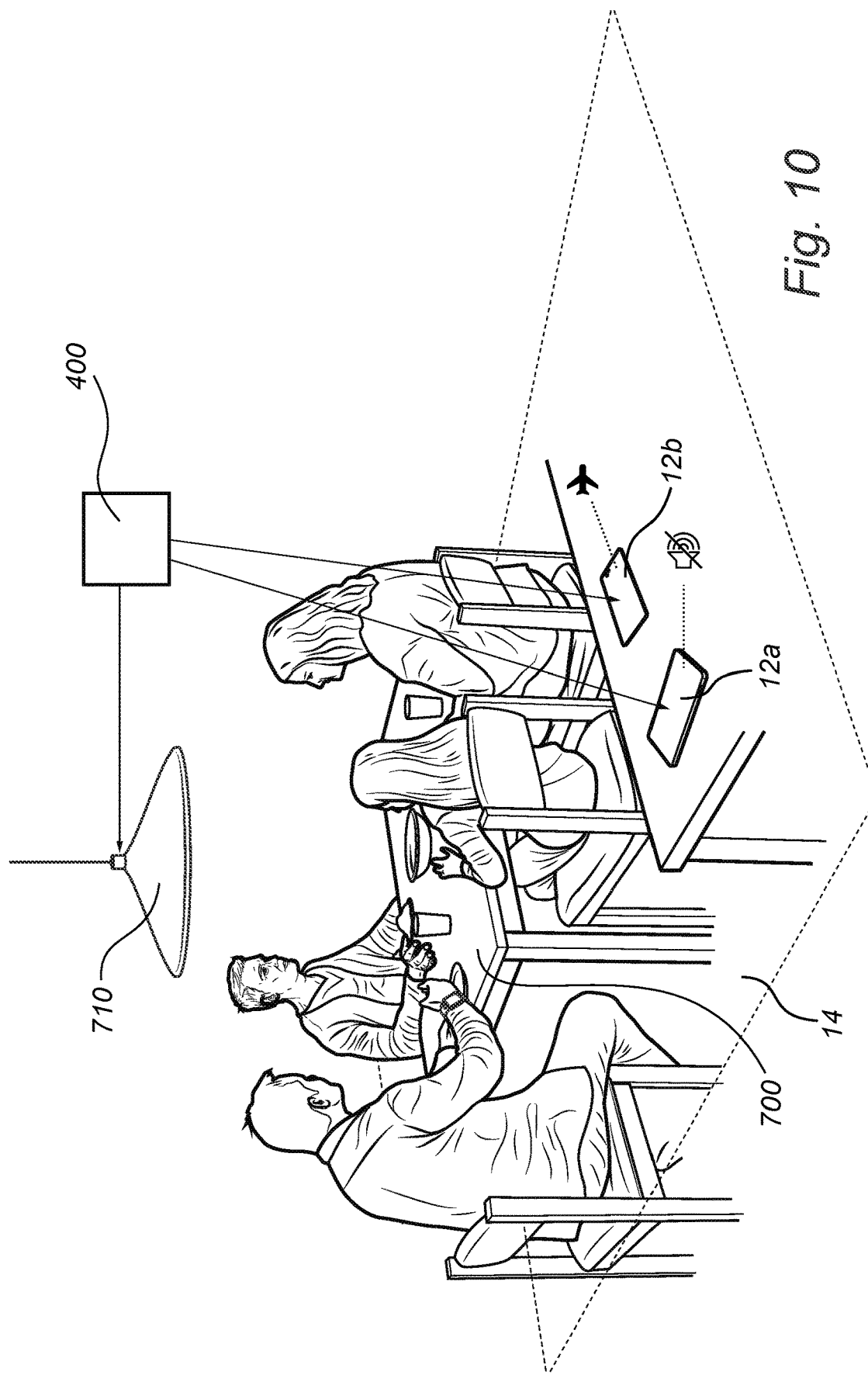

METHODS AND SYSTEMS FOR CONTROLLING AN ELECTRONIC DEVICE IN A SMART HOME SYSTEM

CROSS-REFERENCE TO RELATED-APPLICATION(S)

This application claims priority to European Patent Application No. 21183224.1, filed Jul. 1, 2021, and which application is hereby incorporated by reference in its entirety. To the extent appropriate, a claim of priority is made to the above-disclosed application.

TECHNICAL FIELD

The present disclosure relates to methods and systems for controlling an electronic device in a smart home system.

BACKGROUND

The number of things being connected to internet presently increases at an exponential rate. This number is expected to be doubled within five years. In a home, such connected things may include household items, lighting, home alarms, etc., but also home furnishing products such as, e.g., a couch or a dinner table. The rapid development of connected things, and particularly constantly connected smartphones, may leave little room for digital silence in a family. For instance, attention to a smartphone screen due to the increasing amount of available information, notifications, etc., has gradually been prioritized in favor of human conversations during, e.g., dinner time and/or other family gatherings in the home. Further, the number of connected things may give an illusion that all electronic devices in a home control themselves according to an expected behavior. Hence, home safety may be jeopardized, e.g., in connection with home alarm systems, etc.

Hence, there is need for an approach to provide a relaxing digital environment in a home. Further, there is need for an approach to enhance safety in a home.

SUMMARY

Thus, it is an object of the invention to provide an approach for providing a relaxing digital environment in a home.

Another object of the invention is to provide an approach for enhancing safety in a home.

According to a first aspect, there is provided a computer implemented method in a smart home system, the method comprising defining, by sensing an indoor position of a wearable electronic device comprising an indoor positioning module, an area in a real-world indoor environment, attributing a rule to the defined area, the rule comprising one or more settings to be applied to one or more electronic devices upon a user being detected in the defined area.

This may facilitate setting up a digital and/or physical environment in the real-world indoor environment, wherein the physical environment herein generally refers to a physical state of an electronic device. The sensing of an indoor position of the wearable electronic device, e.g., a smartphone, may by way of example be done by using light detection and ranging, LiDAR, augmented reality, AR, or the like. The term "smartphone" as used herein, is preferably to be interpreted as a normal smartphone as of a smartphone commonly available at the date of filing of this disclosure. However, any future equivalent of today's smartphone may be an equally applicable interpretation, provided the future equivalent is a mobile electronic device configured to communicate wirelessly with another electronic device. The rule may be a rule associated with a setting of a smartphone, such as setting the smartphone in one or more of "Airplane mode", "Private browsing", "Silent mode", etc. Alternatively, the rule may be any change of lighting, sound level, heat level, etc. For instance, should the defined area be a floor area on which a dinner table is placed, the attributed rule to that area may be to set any smartphone located in the area in "Silent mode". Alternatively, or additionally, the attributed rule may be to turn off a television, adjust a ceiling light, or the like. Yet another alternative of the attributed rule may be to enable and/or disable streaming services or other digital services such as applications associated with the wearable electronic device. Hence, this approach may facilitate setting up a location based preferred digital and/or physical environment. Thus, a location based privacy in the home may be facilitated. Further, the approach may facilitate saving electrical power, as the one or more electronic devices may be turned off by the one or more settings associated with rules attributed thereto.

According to a second aspect, there is provided a smart home controller comprising circuitry configured to execute:

an area defining function configured to, based on an indoor position received from a wearable electronic device, define an area in a real-world indoor environment; and a rule attributing function configured to attribute a rule to the defined area, the rule comprising one or more settings to be applied to one or more electronic devices upon a user being detected in the defined area.

The above-mentioned features of the first aspect, when applicable, apply to this second aspect as well. In order to avoid undue repetition, reference is therefore made to the above. The smart home controller may be a router or a gateway. The smart home controller may communicate wirelessly with the wearable electronic device and the one or more electronic devices, which may provide efficient routing of network data traffic and prioritization of the same.

According to a third aspect, there is provided a computer implemented method for controlling one or more electronic devices in a smart home system, the method comprising detecting presence of a user in a defined area having a rule attributed thereto, the rule comprising one or more settings to be applied to the one or more electronic devices upon the user being detected in the defined area, controlling the one or more electronic devices according to the rule in response to the detected presence of the user in the defined area.

The detection of presence of the user in the defined area may be done by an image sensor or a depth sensor, thereby facilitating a relatively well-defined location of the user in the defined area. Alternatively, or additionally, the user may carry a physical tag that may facilitate a relatively well-defined location in the defined area. By way of example, the physical tag may be an external or, in a smartphone, built in ultra-wideband, UWB, tag for communication of a relatively well-defined location in the defined area. The presence of the user in the defined area may thereby control an electronic device located elsewhere. For instance, the defined area may be an area in a living room in a home. Upon detecting the user being located in the area in the living room, an example rule attributed to the area may be switching off a ceiling light in a bedroom. Hence, this may facilitate saving electrical power. Further, detecting presence of a plurality of users in the defined area, a rule attributed to the defined area may be to set a smart device of a respective user in "Silent mode" and/or any equivalent thereof. This may facilitate human interaction between family members in a family. By way of example, the rule may be applied when the family members sit around the dinner table, where the dinner table thereby be associated with the defined area. Hence, (digital) privacy may thereby be facilitated.

Another advantage may be facilitating safety in a home. For instance, when a user goes to bed, one or more doors of the home may be locked and/or a home alarm system may be turned on. This may apply to other buildings or vehicles in connection with the estate on which the home of the user is located. Such a building may, e.g., be a garage. Hence, a garage door may be closed (if open) and locked, and an alarm system installed thereto may be activated when the user goes to bed. The same may apply for, e.g., a car, i.e., locking its doors and activating a car alarm. In this example, the bed is located on the defined area. To avoid locking the doors and turning on the home alarm system if resting on the bed during day time, rule attributed to the defined area may depend on the time of the day.

According to a fourth aspect, there is provided a smart home controller comprising:
  circuitry configured to execute:
    a presence detecting function configured to detect presence of a user in a defined area in a real-world indoor environment,
    a rule function configured to check whether the defined area having a rule attributed thereto, the rule comprising one or more settings to be applied to one or more electronic devices upon the user being detected in the defined area, and
    a control function configured to, in response to a positive check whether the defined area having a rule attributed thereto, generate one or more control signals comprising instructions for controlling the one or more electronic devices according to the rule; and
  a communication unit configured to send the one or more control signals to the one or more electronic devices.

The above-mentioned features of the third aspect, when applicable, apply to this second aspect as well. In order to avoid undue repetition, reference is therefore made to the above. By way of example, the smart home controller may be a gateway or a hub. The communication unit may communicate wire-based or wirelessly with the one or more electronic devices.

According to a fifth aspect, there is provided a smart home system comprising:
  a presence detecting device configured to detect presence of a user in a defined area of a real-world indoor environment,
  a smart home controller comprising:
    circuitry configured to execute:
      a rule function configured to check whether the defined area having a rule attributed thereto, the rule comprising one or more settings to be applied to one or more electronic devices upon the user being detected in the defined area, and
      a control function configured to, in response to a positive check whether the defined area having a rule attributed thereto, generate one or more control signals comprising instructions for controlling the one or more electronic devices according to the rule,
    a communication unit configured to send the one or more control signals to the one or more electronic devices.

The above-mentioned features of the third and fourth aspects, when applicable, apply to this fifth aspect as well. In order to avoid undue repetition, reference is therefore made to the above.

According to a sixth aspect, there is provided a toggle button device comprising:
  a toggle button configured to generate an activation signal in response to a user toggling the toggle button;
  an indoor position module configured to determine an indoor position of the toggle button device;
  a communication unit configured to, in response to the user toggling the toggle button, generate an output signal, wherein a type of output signal is dependent on the indoor position, or the output signal comprises the indoor position.

The toggle button device may be viewed as being functioning as the previously discussed wearable electronic device having a reduced number of features compared to, e.g., a smartphone or a smartwatch, etc. Hence, the toggle button device may provide a simpler and cheaper approach for a location-based privacy and/or facilitating home security.

According to a seventh aspect, there is provided a toggle button system comprising a toggle button device, and a gateway configured to receive the output signal generated by the toggle button device, and control one or more electronic devices based on the output signal.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments, with reference to the appended drawings, where the same reference numerals will be used for similar elements, wherein:

FIG. 10 shows an example use case of detecting presence in a defined area and control electronic devices accordingly.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
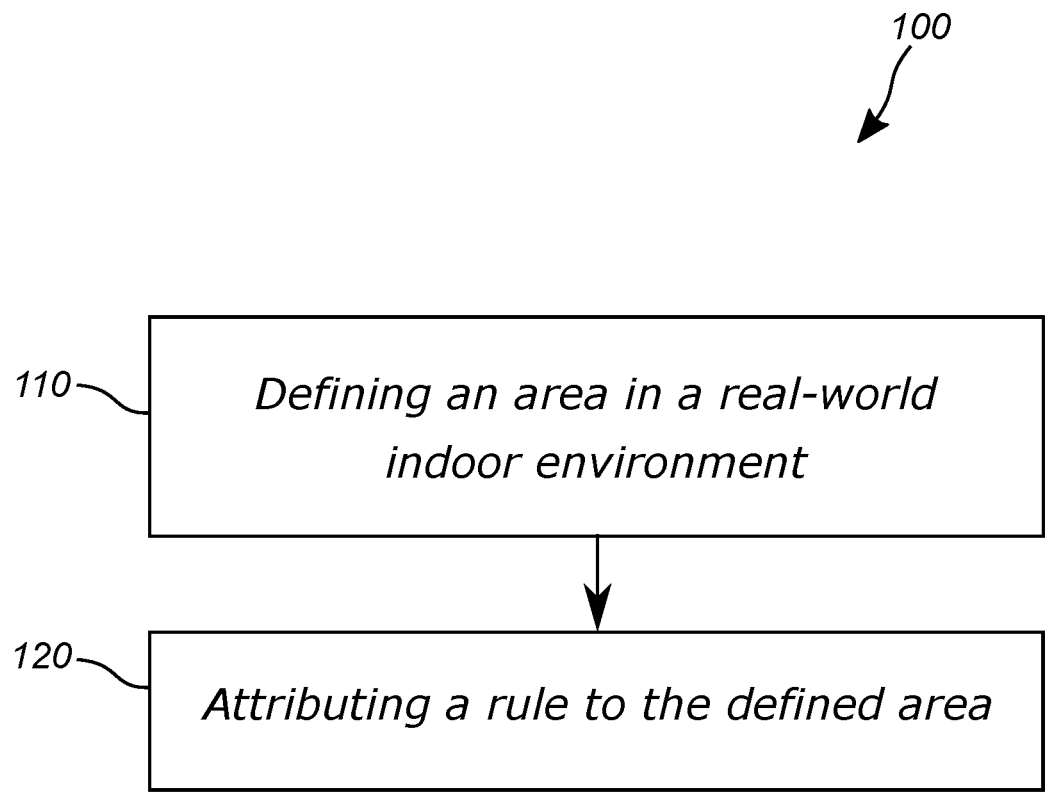
FIG. 1 shows a flowchart of a method for defining an area and attributing a rule to the area in a real-world indoor environment.

In connection with FIG. 1 there is shown a flowchart of a computer implemented method 100 for defining an area and attributing a rule to the area in a real-world indoor environment. FIGS. 2 and 3 may advantageously be viewed in parallel in connection with the description of FIG. 1. The method 100, applicable in a smart home system, comprises defining 110, by sensing an indoor position 10 of a wearable electronic device 12 comprising an indoor positioning module, an area 14 in a real-world indoor environment. The method 100 further comprises attributing a rule to the defined area 14, the rule comprising one or more settings to be applied to one or more electronic devices upon a user being detected in the defined area 14.

The wearable electronic device 12 may be a smart device, e.g. a smartphone, a smart watch, smart glasses, smart jewelry, a smart tag, a smart fob, a smart ring, etc. Typically, the smart device is attributed with a user. The wearable electronic device 12 may be capable of communicating with other electronic devices. Preferably, the communication is wireless. A wireless communication may facilitate a freedom of movement for the user while carrying the wearable electronic device.

The area 14 in the real-world indoor environment may be defined using augmented reality, AR, techniques such as light detection and ranging, LiDAR, or the so-called AR-kit, etc., in combination with the indoor position 10 of the wearable electronic device using any beacon technology having position determining properties such as an ultra-wideband, UWB, module. Assisting technologies, such as an accelerometer built in the electronic device, may be possible to provide for higher accuracy upon determining the position of the electronic device. The accelerometer may advantageously be implemented in the event of movement of the electronic device, but less useful in static objects, such as a sofa or a dinner table since forces on such static objects in practice are constant. The step of defining the area 10 will be further described below.

The rule may be a rule associated with a digital service of a smart device. Such a digital service may comprise one or more of, notifications, location services, a sensor such as a microphone, private browsing, child-safe browsing, "Airplane mode", "Silent mode", Bluetooth®, reminders, speech recognition, AI assistant, applications and communication limits, etc. Alternatively, or additionally, the rule may be any change of lighting, sound level, heat level, etc. of the one or more electronic devices thereof. Hence, the one or more electronic devices may comprise a smart device, a router, a smart home appliance such as a home alarm, a television, a blind, etc. For instance, if the defined area 14 is a floor area on which a dinner table is placed, the attributed rule to that defined area 14 may be to set any smart device located in that defined area in "Silent mode". Alternatively, or additionally, the attributed rule to the area 14 may be to turn off a television, adjust a ceiling light, or the like. Hence, this approach may facilitate setting up a location based preferred digital and/or physical environment. The rule attributed to a specific defined area may be associated with a specific user of the wearable electronic device being present in the specific defined area. Alternatively, the rule attributed to the area 14 may be to control router settings of a router such that wireless communication of data between the router and one or more wearable electronic devices is controlled (e.g. prevented, allowed, limited, reported, etc.), optionally for specific applications and/or digital services. This may prevent, e.g., receiving messages or notifications on a smart device, thereby facilitating a location-based privacy. This may also prevent or limit the use of specific applications and/or digital services such as video streaming services or games.

The indoor position module may be configured to wirelessly communicate with a smart home controller to determine characteristics of the wireless signals, such as a signal strength, allowing determining the indoor position of the wearable electronic device 12. Alternatively, the indoor positioning module may be configured to communicate with an external electronic device having a known position in the home, such as a BLE sensor or a UWB sensor, or the like, wherein the external electronic device communicates with the smart home controller. The indoor positioning module may be an active physical tag, such as an ultra-wideband, UWB, module. The UWB module may preferably be built into the wearable electronic device 12. Apart from being capable of transmitting a relatively large amount of data per time unit, UWB may allow determining positions down to centimeter precision. It is appreciated that such a precision may be comparable to the physical dimensions of the wearable electronic device 12. Should even higher precision being desired and/or possible, either by UWB or other similar means, a location of the wearable electronic device 12 may refer to a center of mass of the wearable electronic device 12. Another example of an active physical tag is a Bluetooth low energy, BLE, module, typically built into the wearable electronic device 12. When using a single active physical tag, measurements of distances, directions and orientations may be possible. This may be further facilitated by utilizing beamforming, i.e., by focusing a wireless signal towards a specific receiving device. Alternatively, a plurality of external active physical tags may be possible. In such a situation, the plurality of external active physical tags may be freestanding, hence being separate from the wearable electronic device (although the wearable electronic device may also comprise a BLE and/or UWB module). Such a plurality of external active physical tags may allow trilateration, which may allow to further improve a position accuracy of the wearable electronic device.

Alternatively, the indoor position module may communicate with an external passive physical tag. By way of example, the external passive physical tag may be a Near-field communication, NFC, tag or a Radio Frequency Identification, RFID, communication tag. Hence, when the wearable electronic device is located in vicinity of such an NFC module having a known position, the wearable electronic device may communicate a relatively well-defined position, provided the wearable electronic device comprises built-in NFC communication means for communicating with the NFC tag. Hence, a stored position of the external passive physical tag may provide a position of the wearable electronic device in response to an established connection between the wearable electronic device and the passive physical tag. To provide an aesthetically pleasing impression, the NFC tag may form an integral part of, e.g., a table, such as being built into a tabletop of the table, or the like. The discussion regarding the NFC tag may equally well apply to an RFID tag, should the indoor position module be an RFID tag. Any adequate passive or active indoor position module is possible within the scope of the claims. This embodiment facilitates an easy way of determining a user position by for example placing the smart phone on such an external passive physical tag to "check in" at, e.g., the dinner table to automatically apply the rule attributed to the dinner table.

Respective electronic device of the one or more electronic devices may preferably be a smart device and/or a smart home appliance. A smart home appliance is understood being an electronic device connected to other electronic devices or networks via different wireless protocols such as Bluetooth, Zigbee, Thread, NFC, Wi-Fi, LiFi, 5G, etc., that can operate, at least to some extent, interactively and autonomously. A smart home appliance herein may be a dishwasher, a lamp, a blind, a television, a carpet, a motorized window or door, a home alarm system and/or a part of a home alarm system, an oven, a refrigerator, a washing machine, a door lock, etc. A plurality of smart home appliances in a home may form an Internet of Things, IoT, network. Respective smart home appliance in such an IoT network may comprise an active physical tag used to estimate the position of a wearable electronic device 12 in the real-world indoor environment. In the event of the IoT network being utilized for such a purpose, the number of freestanding physical tags may be reduced to further facilitate an aesthetically pleasing impression of the real-world indoor environment.

The attributed rule to the defined area 14 may be set by a user. Alternatively, the rule may be suggested by the smart home system based on a history of user defined rules attributed to similar areas. Alternatively, or additionally, the rule may be estimated by statistical data analysis, a trained neural network or any equivalent type of machine learning, ML, means implemented in the smart home system. In such a case, regions of the real-world indoor environment may be monitored (by radar, mmWave, LiDAR, etc.) in which one or more specific activity zones may be recognized. Such an activity zone may at least partly correspond to the defined area 14 and may correspond to a specific activity (e.g., eating or watching TV) or a specific type of activity (e.g., socializing or sitting). For instance, if, in an ML implementation, a dining area (dinner table) is recognized, an attributed rule associated with wearable electronic devices within a corresponding activity zone (and/or activity) thereof may be setting the wearable electronic devices in a specific mode, e.g., silent mode. The recognized activity may be, at least in an initial phase of establishing the method 100 in the smart home system, followed by suggesting a set of rules such that a specific rule may be manually chosen (i.e., a preferable rule) by the user. Hence, a behavior pattern of the user may emerge over time such that another recognized activity zone in the real-world indoor environment may be followed by suggesting a reduced set of rules, or automatically attribute a single rule for the other recognized activity zone. A similar rule attributing procedure may additionally or alternatively be present in a statistical fashion. For instance, if an area 14 and/or an activity zone associated with the area 14 has been defined 110 (by automatic recognition or manually), this may be followed by suggesting a set of rules such that a specific rule may be manually chosen by the user. Over time, statistics of manually chosen rules may be acquired, which may result in suggesting a reduced set of rules in future similar situations. Put in other words, the method 100 may attribute a rule to the defined area 14 (e.g., an activity zone) by suggesting a set of rules by means of ML, statistics, or a combination thereof, from which set the user chooses a preferable rule, thereby reducing the set of rules in future suggestions.

The step of defining the area 14 may comprise detecting a piece of furnishing 50 by analyzing an image captured by a camera of the wearable electronic device 12, displaying, on a display 16 of the wearable electronic device 12, an augmented reality, AR, or virtual reality, VR, representation of the real-world indoor environment with the piece of furnishing 50 being highlighted, and defining the area as an area being occupied by the piece of furnishing. It should be appreciated that the piece of furnishing may include the case of a group of pieces of furnishing. Such a group of pieces of furnishing may be a sofa set, a dinner table set including a dinner table and dinner chairs, etc. Any other combination of pieces of furnishing forming a group of pieces of furnishing may be applicable, such as a sofa and a coffee table, a coffee table and a carpet, a bed and a bedside table, or the like. An area occupied by such a group of pieces of furnishing may be defined similarly as for the piece of furnishing described elsewhere in this text.

The defined area may be viewed as a base area of a volume extending perpendicular from the base area. Hence, the method 100, applicable in a smart home system, may comprise defining, by sensing an indoor position of a wearable electronic device comprising an indoor positioning module, a volume in a real-world indoor environment. The method may hence further comprise attributing a rule to the defined volume, the rule comprising one or more settings to be applied to one or more electronic devices upon a user being detected in the defined volume. The volume may have a height corresponding to a distance between a flooring and a ceiling of the real-world indoor environment. Other heights may be equally possible, such as heights being in a span of 0.5-1.5 meters, etc.

Figure 2A:
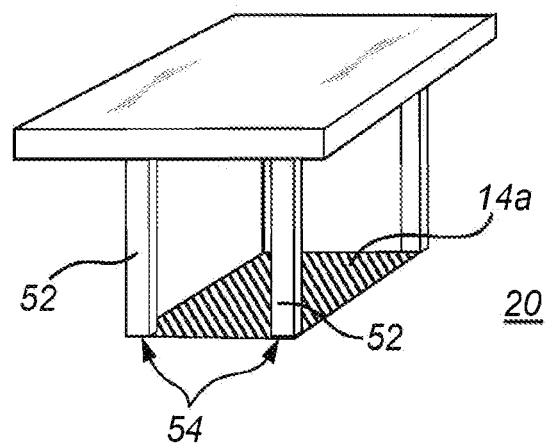
FIG. 2A schematically shows how an area may be defined.
Figure 2B:
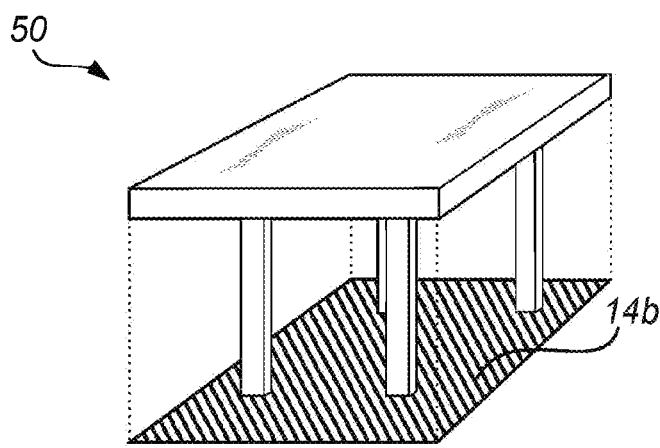
FIG. 2B further schematically shows how an area may be defined.
Figure 2C:
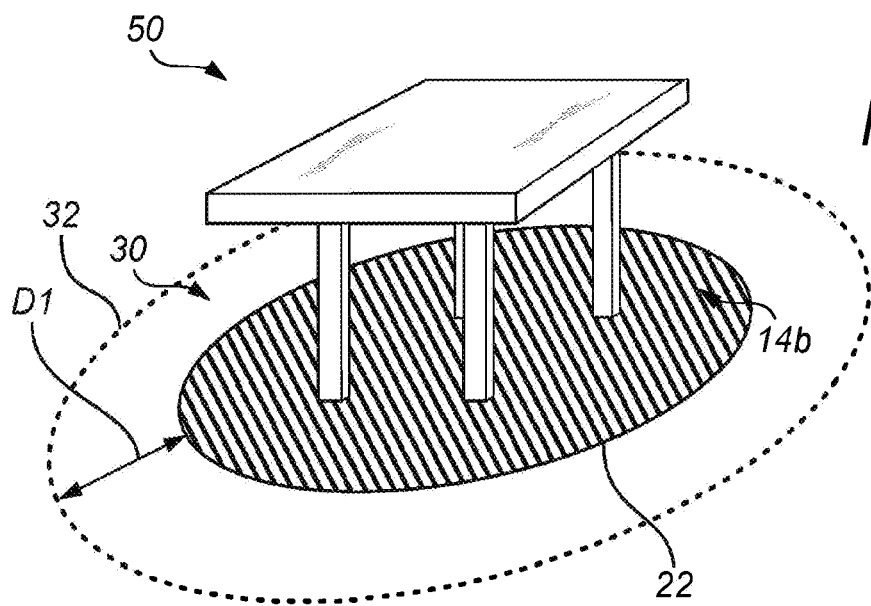
FIG. 2C further schematically shows how an area may be defined.

The piece of furnishing may be a sofa, a carpet, a chair, a dinner table, a coffee table 50, a bed, or the like. Hence, it is understood that the term "piece of furnishing" comprises any piece of furniture. In FIGS. 2A-2C, the piece of furnishing is exemplified by a table 50.

The camera may be any digital camera, such as a digital camera built into a smart device. The image captured by the camera may thereby be a digital image. The AR or VR representation of the real-world environment may visualize and/or augment a set of candidate objects within the real-world environment that may have their services configured. The user may view such an AR or VR representation through a set of smart glasses. Hence, the real-world indoor environment may be viewed through a transparent display on which objects may be augmented. The user may optionally choose such an object manually to be added to the set of candidate objects. The AR or VR representation of the real-world indoor environment may allow to select a specific piece of furnishing 50 within the AR or VR representation of the real-world indoor environment such that the area 14 occupied by the specific piece of furnishing 50 may be defined. Whenever the piece of furnishing, in the AR- or VR representation of the real-world indoor environment, is highlighted, it is understood that the piece of furnishing 50 is colored in a relatively distinct color, or that the piece of furnishing 50 is colored in its real color(s) whereas its surroundings is gray-scaled, or the like. Alternatively, the highlighting may be any adequate way of distinguishing the piece of furnishing, such as artificial rendering of a surface of the piece of furnishing 50 by a pattern being possibly periodic, pronouncing an edge of the piece of furnishing, etc. The type of highlighting, e.g., color, type of pattern, etc., may indicate which rule should be applied. Optionally, the user may acknowledge whether the piece of furnishing 50 is a desired piece of furnishing, and/or whether an edge of the piece of furnishing coincides with reality, etc. In connection with the AR highlighting, information concerning a current state and settings of the highlighted object may be communicated to the user. A current state of the highlighted object may include which rule is attributed to the highlighted object and further information of that rule. The settings may, e.g., include a time period during which the rule shall apply. This will be further described below. The defined area may be a vertical projection of the piece of furnishing such that an outermost circumferential edge of, e.g., a tabletop of a table defines a floor area 14b which the table 50 is considered to occupy. This scenario is seen in FIG. 2B. The area may, equally plausible, be defined by the area spanned by intersections between free ends 54 of a set of table legs 52 and the floor 20. By way of example, provided the table 50 comprises four legs 52 arranged such that the intersections form a rectangle, the defined area 14a may be the rectangle in question.

To build or load a spatial representation (i.e. calculating/determining a 3d space) of the real-world indoor environment and objects, such as pieces of furnishing, therein, an electronic device having AR capabilities, e.g., the wearable electronic device, combined with a position sensitive sensor, possibly built into the wearable electronic device, may be used. The digital camera may detect a set of feature points in a first captured digital image while the digital camera is located on a first location. Preferably, the set of feature points in the captured digital image are relatively distinct in that the feature points comprise one or more corners of a piece of furnishing, a center of a small object having a relatively large difference in color compared to a color of its nearby surroundings, or the like. By changing the location of the digital camera while maintaining a substantially similar view angle, a second captured digital image may comprise at least a portion of the set of feature points to be detected. From the positions of the feature points of the first and the second captured digital image a transformation matrix may be calculated. The transformation matrix may include a translation, rotation and scaling, where scaling may be applicable should the first and the second digital image be captured using different zoom settings of the digital camera. Hence, a spatial representation of the real-world indoor environment may be calculated using an ordinary digital camera. Once a spatial representation of a piece of furnishing has been determined, an area on which the piece of furnishing occupies may be readily be obtained by, e.g., projecting 3D coordinates of the piece of furnishing to a horizontal plane, i.e., a flooring of the real-world indoor environment. Alternatively, the digital camera may be supported by a positioning sensor to further facilitate calculation of the spatial representation, and thereby an area occupied by a piece of furnishing. A LiDAR sensor may alternatively be used to calculate the spatial representation of the real-world indoor environment. If using a LiDAR, a single LiDAR sensor position may be enough to capture coordinates representing the real-space indoor environment. A flooring area occupied by a piece of furnishing may thus be calculated similarly as per the above, i.e., a vertical projection of a point cloud, captured by the LiDAR, representing the piece of furnishing in question. By using the position of the wearable electronic device (determined by the positioning sensor of the wearable electronic device) and the above mentioned alternatives of determining positions for objects relative to the position of the wearable electronic device, a coordinate system of the home and the objects therein may be determined. The positioning sensor of the wearable electronic device may include an UWB/BLE sensor or a GPS sensor, or any other suitable sensor for determining an indoor location of the wearable electronic device. Alternatively, a spatial representation of the real-world indoor environment and objects therein may be generated utilizing the wearable electronic device for measuring distances to points in the environment. Combined with distances to beacons and/or cameras may allow to determine the defined area from positions of the beacons and/or cameras.

The method may further allow to define a threshold distance D1 with respect to the defined area such that the rule may be applied also when the user and/or the wearable electronic device 12 is located within the threshold distance from the defined area. The threshold distance D1 may be such that it defines an edge 32 of a second defined area 30 configured to cover the defined area 14. The threshold distance D1 may be a shortest distance between a specific point of the edge 32 and an edge 22 of the defined area 14. The threshold distance D1 may vary between the defined area 14 and the second defined area 30. Hence, the second defined area 30 does not necessarily be a simple linear scaling of the defined area 14 but may have a different geometrical shape. By way of example, the defined area 14 may be rectangular while the second defined area 30 may be circular or elliptical, or vice versa. Hence, when the wearable electronic device and/or the user is/are located in a region being vertically displaced from the defined area, the rule attributed to the defined area may be applied. Hence the region may be any three-dimensional, 3D, coordinate located within a vertical pillar having the defined area as its base area; see FIGS. 3A-3B. Preferably, the base area is a floor area of a flooring of the indoor real-space environment. Optionally, the user may adjust boundaries of the defined area 14 such as scaling the defined area, changing geometry of the defined area 14, shift a center of the defined area 14, or the like.

Figure 3A:
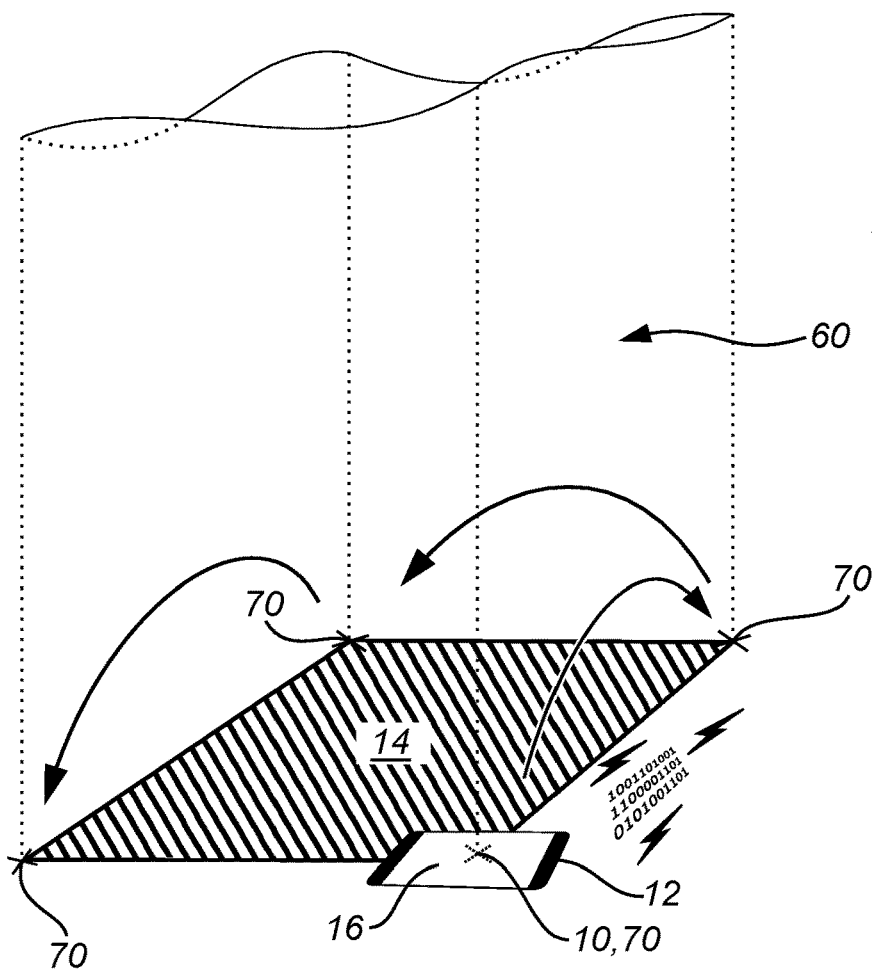
FIG. 3A show an example of how to define an area using a wearable electronic device.
Figure 3B:
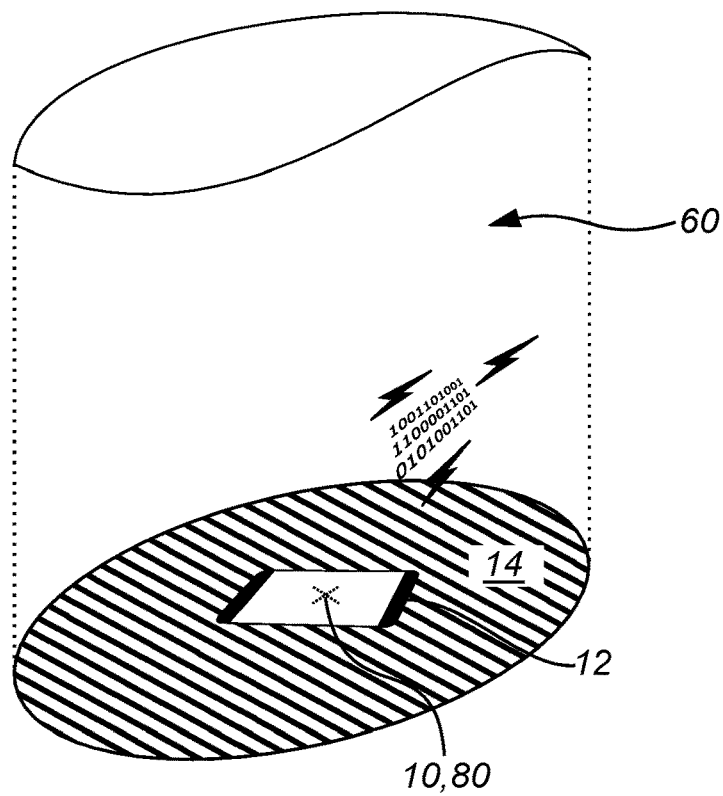
FIG. 3B shows another example of how to define an area using a wearable electronic device.

In connection with FIG. 3A-3B there are shown examples of how to define the area. The step of defining the area 14 in the real-world indoor environment 60 may comprise defining corners 70 of the area 14 by sensing positions 10 of the wearable electronic device 12 upon actuation of corner setting inputs being registered. A corner setting input may be an input set by the user while the wearable electronic device is located on a corner 70 of the area 14 to be defined. The corners 70 of the area 14 may be corners of a rectangle if the area is rectangular, e.g., for a rectangular table associated with a rectangular defined area 14. Hence, the number of corners may be four. However, any number of corners is possible. The area may be defined by an area enclosed by the corners 70, wherein each adjacent pair of corners are connected by a straight line. Hence, provided four corners are considered, these four corners may be associated with four interconnected straight lines. The skilled person appreciates that, given a set of corners located such that spanning an area, a plurality of combination of straight lines may be possible, except for when the number of corners is three, i.e., spanning a triangle. However, generally, the area in question may be such that the straight lines are arranged to maximize the area to be defined by the corners 70. Provided a rectangular geometry is to be defined, the method 100 may allow defining only three corners, whereafter the fourth corner may be calculated by utilizing symmetry properties of a rectangle. This may be equally plausible with any other geometry having certain symmetry properties. It should be further appreciated that a rectangle may be defined upon defining an even smaller number of corners provides information of orientation of the area, etc. is communicated. For each corner 70, the wearable electronic device 12 may communicate its own location 10 with the smart home controller such that the smart home controller registers the location of the wearable electronic device 12, and thereby the location of the defined area. The wearable electronic device 12 may communicate its own location 10 with the smart home controller by, e.g., a built-in UWB module. Alternatively, or additionally, an image sensor with a known position, forming part of a camera or a radar-based device such as LiDAR or mmWave, may be used to determine the locations 10 of the wearable electronic device 12 such that the corners 70 per the above may be determined.

Alternatively, the user may place the wearable electronic device on a specific location, whereby a dome around the location is established forming a region in which the rule is attributed. In such a situation, a radius of the dome may be automatically estimated, or manually set by the user.

The step of defining the area in the real-world indoor environment 60 may comprise defining a center 80 of the area 14 by sensing positions of the wearable electronic device 12 upon actuation of center setting input being registered. This is demonstrated in FIG. 2C. The center 80 of the area 14 may be a center of mass of the area 80. Defining a center 80 of the area 14 may be desirable if a circular area is to be defined. In such a situation, the wearable electronic device 12 may communicate its own location 10 while physically being located on the center 80 of an intended circular area 14. Further, a user may provide a desirable radius of the intended circular geometry, such that the circular area may be defined. The skilled person appreciates that a circular or elliptic area may be defined from a set of coordinates. For instance, given that a plurality of coordinates have been communicated with the smart home controller, the smart home controller may interpolate the plurality of points to estimate or approximate any desirable geometry, e.g., a circle or an ellipse. Such an interpolation may, e.g., include a least square method or the like. Alternatively, the wearable electronic device 12 may itself, from the plurality of coordinates, estimate or approximate a set of parameters associated with a circle or an ellipse, the set of parameters comprising, e.g., a center, focal points, a radius, major/minor axes, etc. The skilled person appreciates that this reasoning is applicable to any other adequate geometry of the area to be defined.

The method may further comprise at least one of defining an extension of the area by registering an extension input and defining a shape of the area by registering a shape input. The extension of the area may depend on a size of the object. The extension of the area may scale linearly with the size of the object. The extension of the area may be in a plane of the defined area 14 and/or along an extension perpendicular to the defined area 14, e.g., along a vertical extension from the defined area 14.

The method 100 may further comprise prompting a user to define the area in the real-world indoor environment by displaying an instruction on a display 16 of the wearable electronic device 12. The instruction may be an instruction video displayed on a display of the wearable electronic device. This feature is equivalently applicable should the wearable electronic device 12 lack a display, which may be the case for, e.g., smart jewelry, etc. In such a situation the instruction may be displayed on a display connected to the wearable electronic device, the display possibly being a display of a smartphone, of AR- or VR glasses, or the like. Alternatively, or in combination, the instruction may be a text instruction. Alternatively, or in combination, the instruction may be an animation displayed on a display. Alternatively, or in combination, the instruction may be a voice instruction.

The rule may further comprise a time period during which the rule is to be applied to the one or more electronic devices. Returning to the above-mentioned example regarding the dinner table, the rule may, apart from being attributed in connection with a vertically extending region having a base area spanned by a vertical projection of the dinner table (possibly extended as described above), also be limited to a time period, preferably being a time period coinciding with a typical dinner time. The time period may be set manually by the user, or estimated, where the estimation may be based on a history of time periods during which dinner is eaten. Should there be a plurality of involved wearable electronic devices, respective wearable electronic device may be associated with differing time periods, if desirable. The time period may be any adequate time period, such as a periodically occurring time period, i.e., the same time period for every day. Alternatively, the time period may occur on a single day every week, a plurality of days every week, etc. The time period may be subject to a schedule, the schedule possibly being non-periodic.

The method may further comprise storing the defined area and the rule attributed thereto in a database comprising defined areas and rules attributed thereto. The database may be stored in a smart home controller. The smart home controller may e.g. be an Internet of Things, IoT, hub (gateway, etc.,), or any type of cloud service. Alternatively, or in combination, the defined area 14 and the rule attributed thereto may be stored on the wearable electronic device 12.

Disclosed herein is also a non-transitory computer-readable storage medium having stored thereon instructions for implementing the method 100 having the features described above, when executed on a device having processing capabilities.

Figure 4:
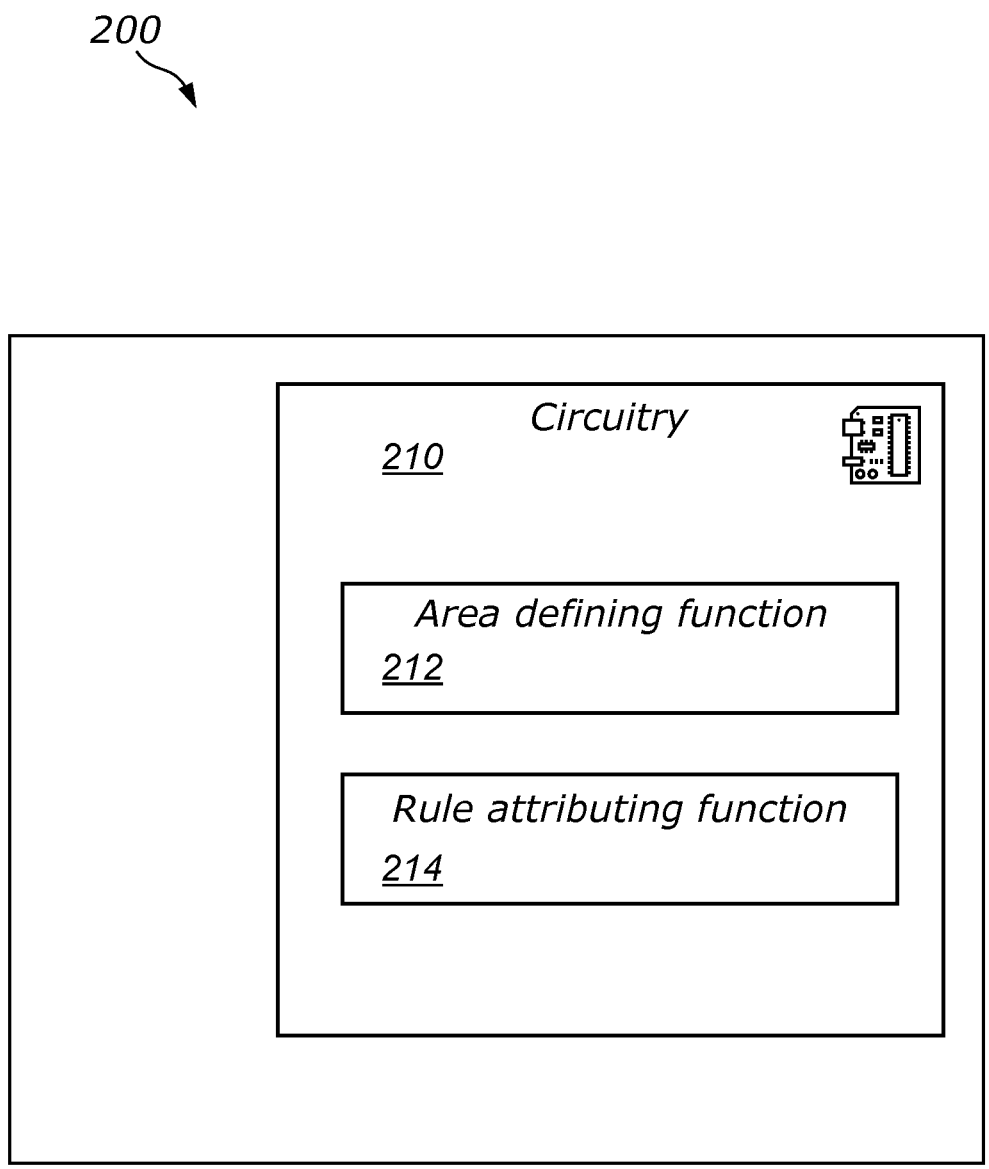
FIG. 4 shows, schematically, a smart home controller associated with the method for defining an area and attributing a rule to the area.

In connection with FIG. 4, there is, highly schematically, shown a smart home controller 200 comprising circuitry 210 configured to execute an area defining function 212 configured to, based on an indoor position received from a wearable electronic device 12, define an area 14 in a real-world indoor environment, and a rule attributing function 214 configured to attribute a rule to the defined area 14, the rule comprising one or more settings to be applied to one or more electronic devices upon a user being detected in the defined area. The smart home controller 200 may be an Internet of Things, IoT, hub, or any type of cloud service. The smart home controller may be entirely based on IP/WiFi, to enable the smart home controller 200 being a pure cloud service. Alternatively, the wearable electronic device 12 may function as the smart home controller 200.

Details regarding the area defining function 212 and the rule attributing function 214 have already been described above. The area defining function 212 is set to perform the "defining of an area in a real-world indoor environment" as discussed above in connection with FIG. 1. The rule attributing function 214 is set to perform the "attributing of a rule to the defined area" as discussed above in connection with FIG. 1. To avoid undue repetition, reference is made to the above, where applicable.

Figure 5:
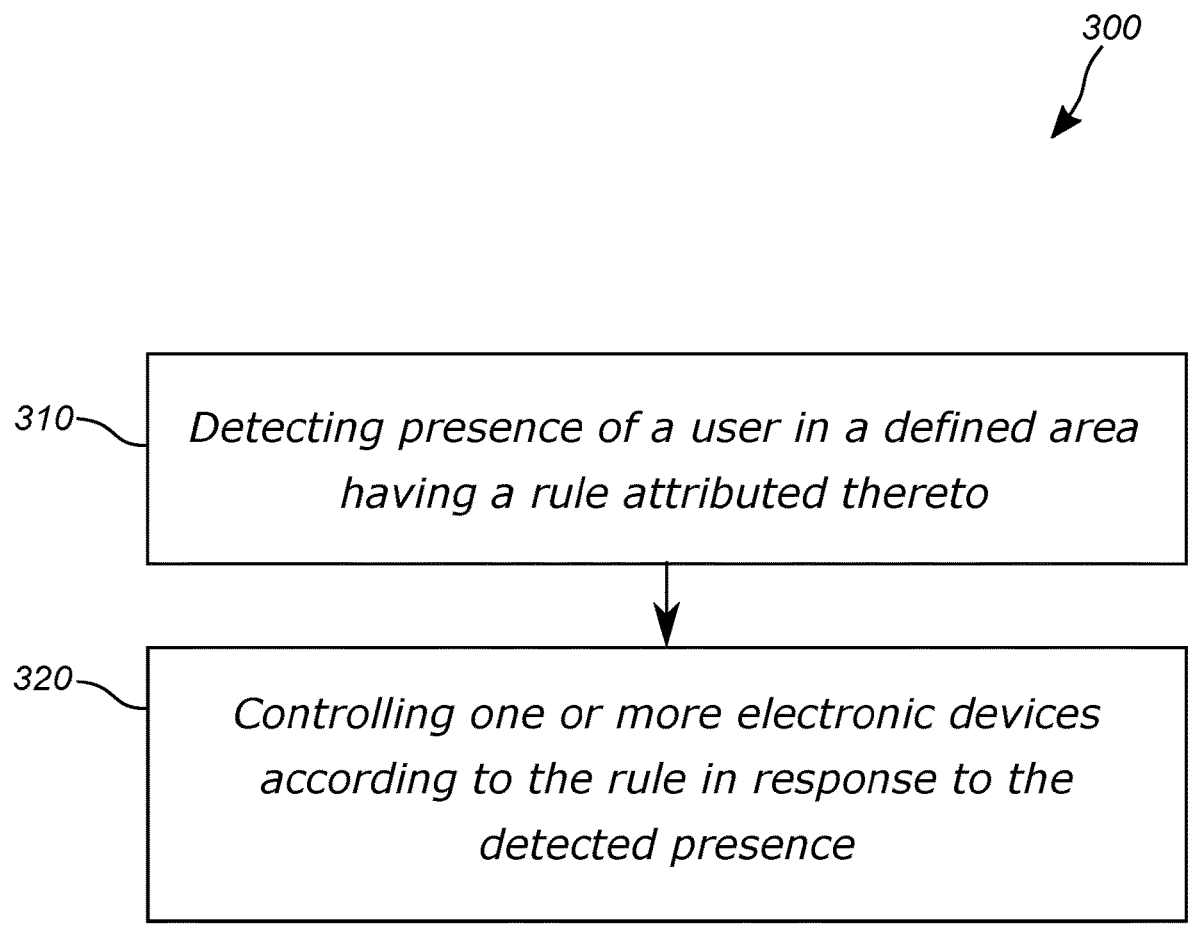
FIG. 5 shows a flowchart of a method for detecting presence of a user and controlling an electronic device based on the detected presence.

In connection with FIG. 5, there is shown a flowchart of a method 300 to control one or more electronic devices in a smart home system. The method 300 comprises detecting 310 presence of a user in a defined area 14 having a rule attributed thereto, the rule comprising one or more settings to be applied to the one or more electronic devices upon the user being detected in the defined area 14, and controlling 320 the one or more electronic devices according to the rule in response to the detected presence of the user in the defined area 14. Details regarding the defined area 14 and how to attribute a rule thereto is described above. Accordingly, what is disclosed above in connection with FIGS. 1-4 may be combined with what will be discussed in connection with FIGS. 5 and 6. The defined area 14 may be in a real-world indoor environment, e.g., a home. Especially, the defined area 14 may be an area on which a piece of furnishing is located. As also described to some extent above, when an object or a user is located "in the defined area" is to be understood as the object or the user is located in a three-dimensional, 3D, region being located vertically above the defined area.

The detection of the presence of the user in the defined area 14 may be done by an image sensor. Such an image sensor may form part of an image capturing device such as a digital camera, a depth camera, a LiDAR, a millimeter wave radar, mmWave, an infrared camera, or the like. Yet again, returning to the example of the dinner table as per the above, the presence of the user sitting at the dinner table may be detected as soon as a vertical projection of a portion of a volume of the user is located within the defined area in connection with the dinner table. Alternatively, also briefly described above, the dinner table may be associated with a threshold distance D1, such that presence may be detected as soon as the user is located within the threshold distance D1 from the defined area 14. Such a threshold distance D1 may be of the order of a decimeter or a meter. The detection of the presence of the user may alternatively be done by a positioning module in a wearable electronic device 12 carried by the user. Such a positioning module may be as described above, e.g., being a UWB or BLE module built into the wearable electronic device 12.

The one or more electronic devices to be controlled in accordance with the rule may comprise a plurality of electronic devices, wherein the rule comprises one or more individual settings for each electronic device of the plurality of electronic devices. By way of example, the plurality of electronic devices may comprise one or more smart devices. Alternatively, or in combination, the plurality of electronic devices may include a router, and/or one or more smart home appliances. An individual setting of an electronic device may include turning off the electronic device, setting the electronic device in "stand by" mode, or the like. The individual setting of the electronic device may include disconnecting the electronic device from the internet by disabling possible Wi-Fi- or Bluetooth connections.

The one or more settings may be set to control an availability of a service of the one or more electronic devices. By way of example, an availability of a service is to be understood as "Silent mode", "Airplane mode", etc. in a smart device. Hence, it may be preferable, when a plurality of users, e.g., family members, sit around the dinner table, to set the availability of a service "Silent mode" for a smart device associated with respective user, hence facilitating privacy and human interaction. Alternatively, or additionally, the availability of a service may be to control a router. In such a situation, the Wi-Fi communication between the router and a wearable electronic device associated with respective user may be turned off as soon as one or more users are detected in the defined area. The control of an availability of a service of the one or more electronic devices may, apart from facilitating privacy and encouraging human interaction, save electrical power.

The one or more settings may be set to control a physical state of the one or more electronic devices. A physical state as referred to herein may be one or more of an electronic device being on or off. A physical state as referred to herein may be a light level of a light emitting electronic device such as a lamp, a television, a display, or a light adjusting electronic device for controlling a light scene. The light adjusting electronic device being, e.g., an electronically controlled blind. A physical state as referred to herein may be a sound level of a sound emitting device such as turning off a kitchen fan, a set of loudspeakers, a doorbell, etc. A physical state as referred to herein may be a heat level such as controlling an air conditioner, a radiator system, or the like. Another example of a physical state may be locking/unlocking a front door and possibly windows of a home, and activation/deactivation of a home alarm system. Hence, another scenario may take place at night, such that when all users have gone to bed, the front door may be locked, and the home alarm system may be activated. This may facilitate a safe home. A related scenario may take place when a user comes home from work/school, whereby the front door may be unlocked, and the home alarm system may be deactivated. Such a deactivation may include additional security such as, e.g., voice/face/eye/fingerprint recognition being communicated by the wearable electronic device to obscure entrance in the home for intruders.

The control of a physical state of the one or more electronic devices may facilitate saving electrical power. For instance, if all family members of a family sits around the dinner table in a living room or in a kitchen, ceiling lights, television(s), computers, etc. in remaining spaces of the home may be turned off, set in sleep mode or the like. In some embodiments, the rule may thus specify which users/devices that needs to be detected within a specific area in order for the rule to apply.

The method 300 may further comprise detecting an activation of a physical toggle button, wherein the act of controlling the one or more electronic devices is to be performed on a condition that the activation of the physical toggle button is detected. The physical toggle button may be stationary positioned in the real-world indoor environment. The real-world indoor environment may comprise a plurality of physical toggle buttons. By way of example, each room in the home may have a physical toggle button. For example, the physical toggle button may be located in proximity to a bed in a bedroom or in proximity to a dining table in a dining room. This may facilitate enhanced security of the home, saving of electrical power, etc. Alternatively, the physical toggle button may be mobile. In case of a mobile physical toggle button the setting to be applied by activating the physical toggle button may be set to vary depending on the location of the mobile physical toggle button.

The method 300 may further comprise detecting a predetermined user gesture, wherein the act of controlling the one or more electronic devices is to be performed on a condition that the predetermined user gesture is detected.

A user gesture may generally be captured by an imaging sensor to determine skeletal and joint coordinates of the body of the user. The imaging sensor may form part of a camera, a LiDAR, an mmWave, an RGBD device, or the like. The determined skeletal and joint coordinates may be mapped against a predetermined set of coordinates, i.e., a set of predetermined user gestures. Detecting the predetermined user gesture may thereby be a best match between the user gesture and the set of predetermined user gestures. The match may depend on a calculated probability. Alternatively, the match may include additional parameters such that situation specific user gestures, e.g., interaction with other objects or users while performing the user gesture.

The predetermined gesture may be raising a hand, e.g., an open hand or a fist, sitting down on a chair, a hand clap, holding up one or more fingers, etc. Another example may be that when the user sits down on an armchair a setting of the wearable electronic device 12 may be changed or updated, wherein the setting may include turning on or off "Private browsing", "Silent mode", or the like. This may facilitate accommodation of private regions in a home for a relaxing and/or customized digital environment. Alternatively, sitting down on the armchair may turn on/off a TV, change ceiling lighting, etc. The act of sitting down on a piece of furnishing may trigger different settings to be applied to one or more electronic devices in the smart home system, the different settings depending on (a type of) the piece of furnishing. For instance, sitting on a chair around the dinner table may trigger certain settings to be applied to a specific electronic device, while sitting on an armchair may trigger other settings to the same or another electronic device, etc. This may reduce a number of physical sensors in a home, such as pressure sensors or light sensors, since a user-furniture interaction per the above may effectively function as such an, e.g., presence detecting sensor. The skilled person appreciates that there are numerous alternatives in connection with this feature.

The rule may further comprise a time period during which the rule is applicable, such that method 300 may comprise determining a time stamp when the user is detected as present in the defined area, wherein the act of controlling is to be performed on a condition that the determined time is within the time period. Yet again, by considering the example of the dinner table, the time stamp may be determined in response to the user sitting down on a chair in connection with the dinner table. Thereafter the one or more electronic devices may be controlled according to the above description during a time period. The time period may be any adequate time period, such as 30 minutes, one or more hours, etc. The time period may be manually set by the user. Alternatively, the method may determine the time period by comparison against a history of typical time periods applicable to dinners in connection with the dinner table. Should the user, or all users of a plurality of users if applicable, have left the dinner table before the time period have expired, the rule may be terminated. A termination of the rule may thereby include setting the one or more electronic devices in a state similar to or same as prior to the time stamp of a start of the time period, e.g., before dinner time. This "reversing" may alternatively or additionally further be applied in situations where the rule is not associated with a time period. That is, the rule may be applied once a user enters the defined area associated with the dinner table, while the rule is terminated to set the one or more electronic devices in a state similar to as prior to the user entered the defined area.

The act of detecting presence of the user may comprise at least one of detecting an indoor position of a wearable electronic device attributed to the user, detecting a position of a physical tag attributed to the user, and monitoring the defined area by a camera. As per the above, the indoor position of a wearable electronic device may be detecting by any standard wireless communication means such as Bluetooth, Wi-Fi, etc. A preferable wireless communication means may be an UWB module built into the wearable electronic device 12, facilitating detecting the indoor position with a relatively high accuracy, such as decimeter- or even centimeter accuracy. It is to be noted that a bandwidth of today's UWB technology may be further extended in the future, and thereby possibly providing a higher position accuracy than being possible today, i.e., at the date of filing of this disclosure. Hence, any future equivalent of today's UWB may be applicable within the scope of the claims. The physical tag attributed to the user may be a UWB module. In this case, the physical tag, i.e., the UWB tag, is a separate device configured to communicate its position directly or indirectly with a smart home controller. Any other adequate physical tag may be possible within the present scope. For instance, the physical tag may be a Near-field communication, NFC, tag configured to communicate its position to a smart home controller via the wearable electronic device. The above description of the NFC module in connection with FIG. 1 is applicable here.

Further, there is disclosed a non-transitory computer-readable storage medium having stored thereon instructions for implementing the method 300 and the features outlined above in connection with the method 300, when executed on a device having processing capabilities.

Figure 6:
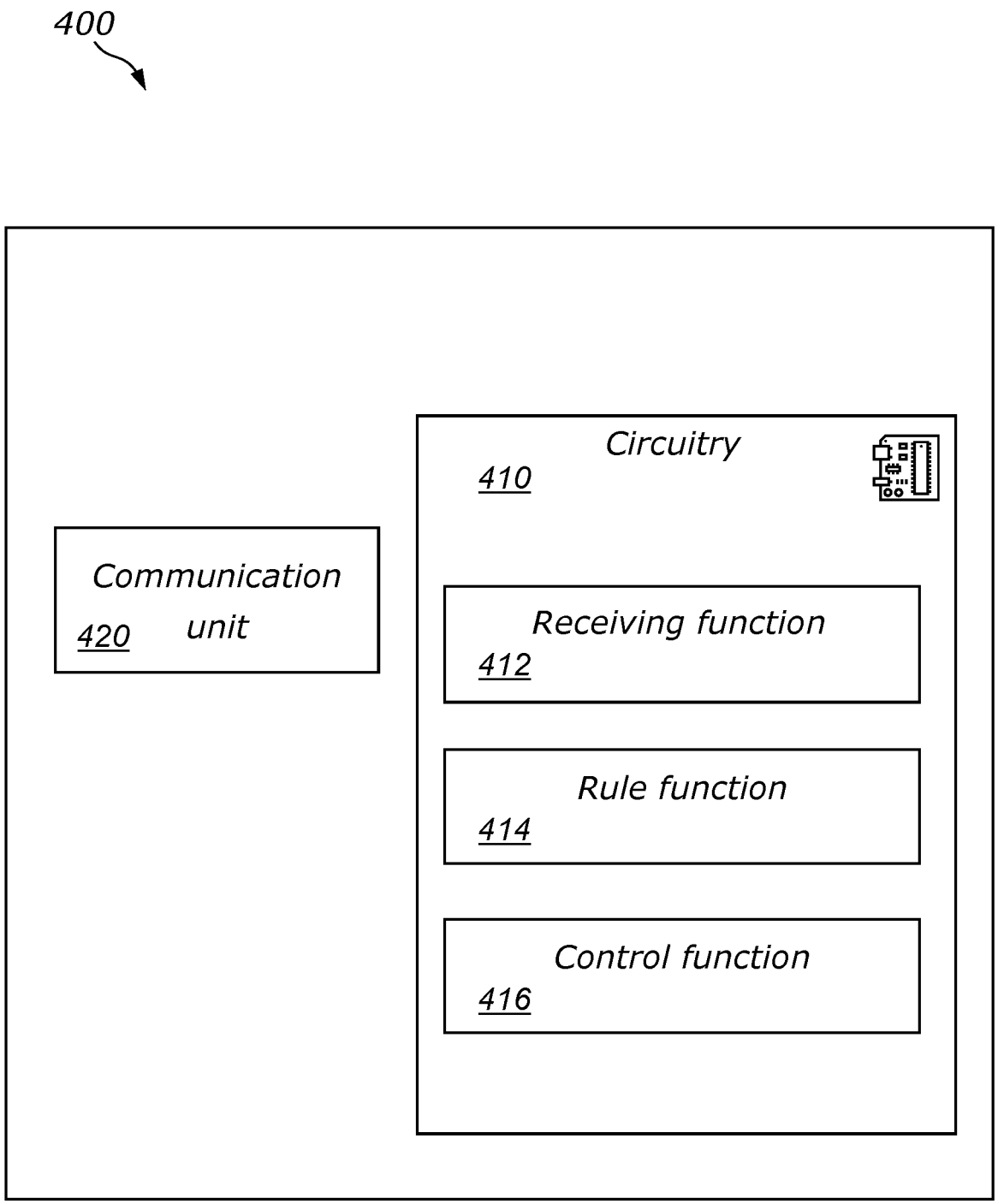
FIG. 6 shows, schematically, a smart home controller associated with the method for detecting presence of a user and controlling an electronic device based on the detected presence.

In connection with FIG. 6 there is, highly schematically, shown a smart home controller 400. The smart home controller 400 comprises circuitry 410 configured to execute a receiving function 412 configured to receive data indicating presence of a user in a defined area in a real-world indoor environment, a rule function 414 configured to check whether the defined area 14 having a rule attributed thereto, the rule comprising one or more settings to be applied to one or more electronic devices upon the user being present in the defined area 14, and a control function 416 configured to, in response to a positive check whether the defined area 14 having a rule attributed thereto, generate one or more control signals comprising instructions for controlling the one or more electronic devices according to the rule. The smart home controller 400 further comprises a communication unit 420 configured to send the one or more control signals to the one or more electronic devices. Such communication with the one or more electronic devices may be direct or via a router or similar configured to route such communication.

The smart home controller 400 may be a smart home gateway. Alternatively, the smart home controller 400 may communicate wire-based or wirelessly with a router. The smart home controller may communicate, preferably wirelessly, with the one or more electronic devices and the wearable electronic device(s). For wireless communication, any bandwidth may be possible, e.g., ordinary bandwidths associated with Wi-Fi signals or Bluetooth signals, or bandwidths associated with ultra-wideband signals.

Details regarding the presence detecting function 412, the rule function 414 and the control function 416 have already been described above. in connection with FIG. 5. The presence detecting function 412 is set to perform the step of detecting of presence of a user in a defined area having a rule attributed thereto, as discussed above in connection with FIG. 5. The rule function 414 and the control function 416 are set to perform the step of controlling of one or more electronic devices according to the rule in response to the detected presence, as discussed above in connection with FIG. 5. To avoid undue repetition, reference is made to the above, where applicable.

Figure 7:
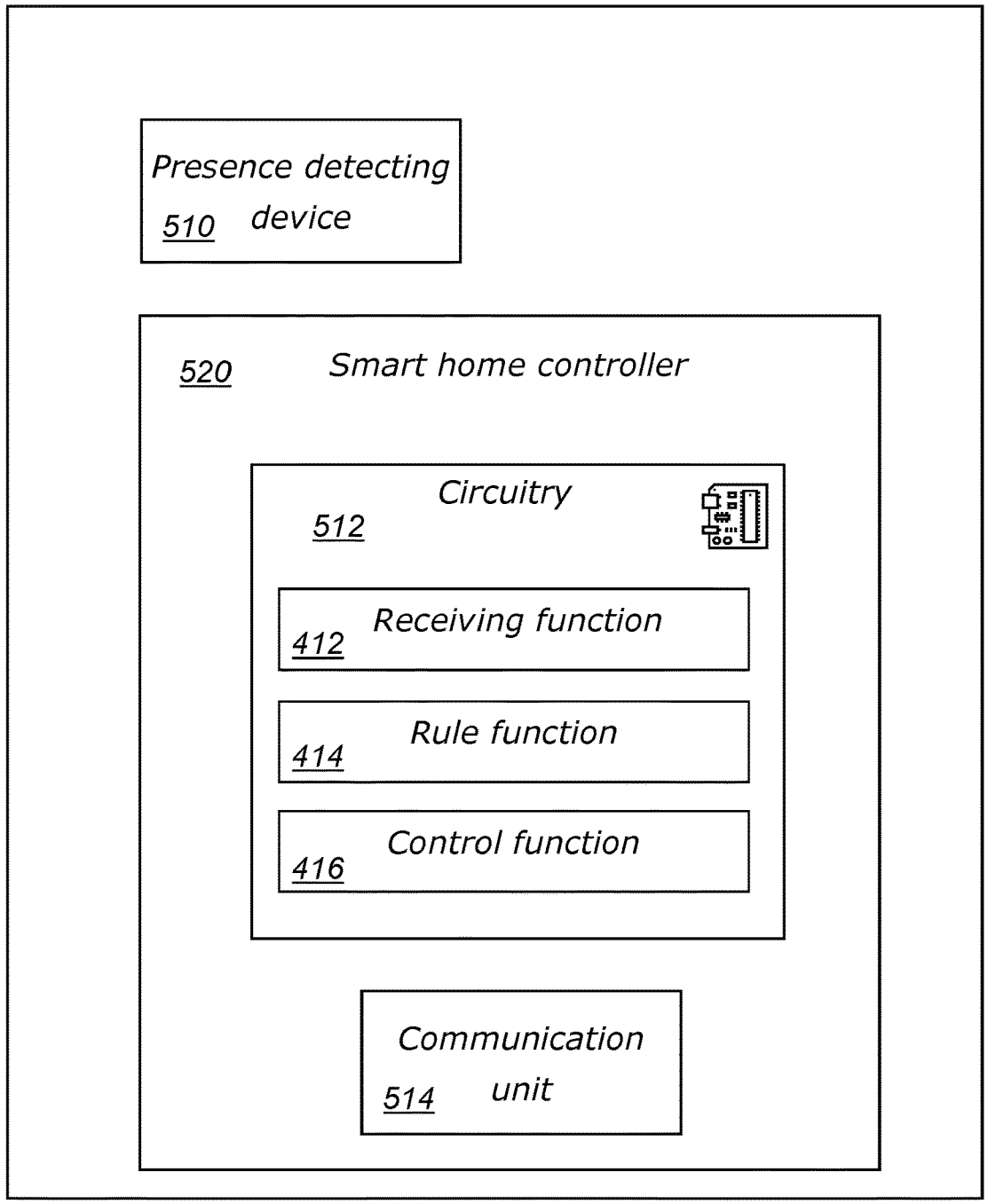
FIG. 7 shows, schematically, a smart home system associated with the method for detecting presence of a user and controlling an electronic device based on the detected presence.

In connection with FIG. 7, there is, highly schematically, shown a smart home system 500. The smart home system 500 comprises a presence detecting device 510 configured to detect presence of a user in a defined area of a real-world indoor environment. The smart home system 500 further comprises a smart home controller 520.

The presence detecting device 510 may comprise at least one of a tracking device configured to track a wearable electronic device 12 attributed with the user, a monitoring camera, a radar such as LiDAR or mmWave, a pressure sensitive sensor, a motion sensor, a temperature sensitive sensor, and circuitry configured to execute a signal pattern determining function configured to determine a signal pattern of a signal emitted by an electronic device, wherein the signal is any one of a WiFi signal, a Bluetooth signal, and a Bluetooth low energy signal.

The tracking device may be configured to determine a position of the wearable electronic device 12. As previously described, the wearable electronic device 12 may be any one of a smartphone 12, a smart tag, a smart fob, a smart watch, smart jewelry, a smart ring, etc. The tracking may be done by, e.g., UWB or NFC technologies according to the above-mentioned text. Alternatively, any equivalent to these technologies may be used for tracking. In the event the tracking device being a monitoring camera, the tracking may be done by analyzing digital images captured by the monitoring camera. The tracking may be done locally at the monitoring camera, or in another device such as a cloud server, by the smart home controller or in any other suitable external device receiving the images from the monitoring camera. The monitoring camera may be an ordinary digital camera configured to capture and communicate an ordinary digital image or a digital video stream with the smart home controller 400. Alternatively, the monitoring camera may be a depth camera configured to capture a depth image such as an RGBD image. From the digital image the position of the user or the wearable electronic device 12 may be detected. Such a detection may be facilitated using, e.g., image segmentation and/or a perspective transformation algorithm to determine the position. Further, skeletal motion of the user may be determined to recognize user gestures and control an electronic device accordingly. In the event the presence detecting device is a radar, any adequate radar technology may be possible. For instance, a LiDAR or an mmWave may be used to determine the position(s). Yet another alternative of a presence detecting device is a pressure sensor. Such a pressure sensor may form part of a piece of furnishing. Such a piece of furnishing may be a carpet. Thus, an area of the carpet may be the define area to which a rule is attributed. Hence, whenever the user is located on such a carpet, the pressure sensor of the carpet communicates the position of the user being on the carpet to the smart home controller 520. However, the user may indirectly activate the pressure sensor of the carpet. For instance, in the event of a sofa being positioned on the carpet, the user may activate the pressure sensor of the carpet by sitting on the sofa. It is thereby understood that the user, via, e.g., a leg of the sofa, may activate the pressure sensor even if the user is located on an area being outside an area of the carpet. The pressure sensor may alternatively or additionally be included in any type of furnishing where a user likely will put pressure on (directly or indirectly) when in the area of, or using, that furnishing, such as a sofa, a chair, a desk, etc.

The smart home controller 520 is just as the smart home controller 400 discussed in connection with FIG. 6 configured to execute a receiving function 412, a rule function 414, and a control function 416. These functions are configured to be executed by circuitry 512 of the smart home controller 520. The rule function 414 is configured to check whether the defined area 14 having a rule attributed thereto. The control function 416 is configured to, in response to a positive check whether the defined area 14 having a rule attributed thereto, generate one or more control signals comprising instructions for controlling the one or more electronic devices according to the rule. The smart home controller 520 further comprises a communication unit 514 configured to send the one or more control signals to the one or more electronic devices. The smart home controller 520 may or may not host the presence detecting device 510.

Details regarding the rule function 414 and the control function 416 have already been described above. in connection with FIG. 5. The presence detecting function 412 is set to perform the "detecting of presence of a user in a defined area having a rule attributed thereto" as discussed above in connection with FIG. 5. The rule function 414 and the control function 416 are set to perform the "controlling of one or more electronic devices according to the rule in response to the detected presence" as discussed above in connection with FIG. 5. To avoid undue repetition, reference is made to the above, where applicable.

Figure 8:
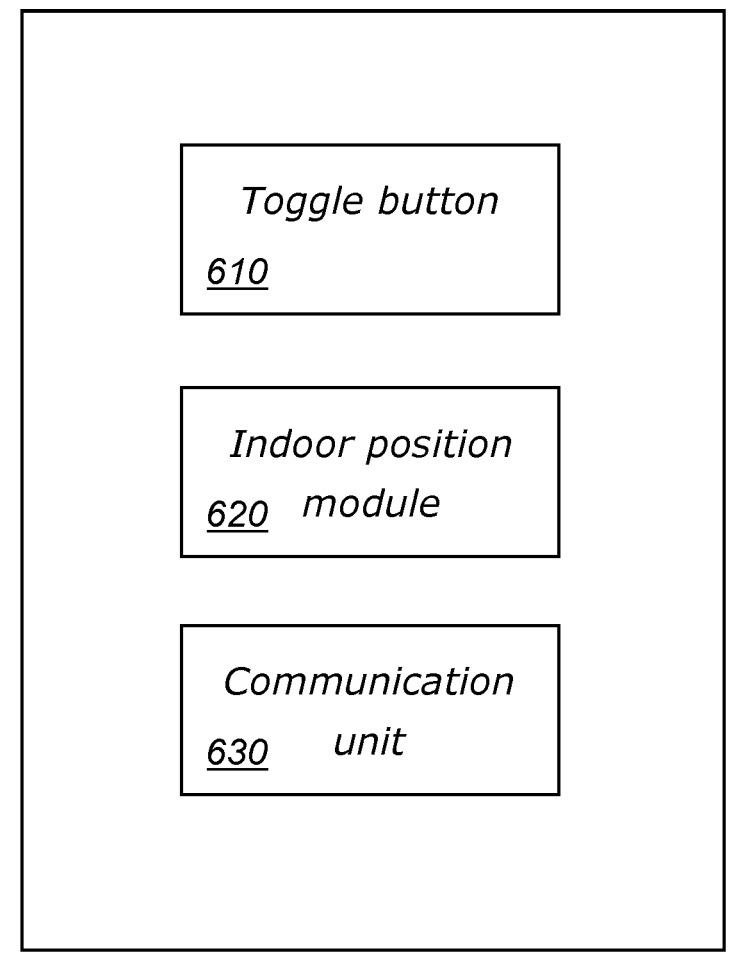
FIG. 8 schematically shows a toggle button device.

In connection with FIG. 8 there is schematically shown a toggle button device 600. The toggle button device 600 may constitute the physical toggle button discussed in connection with the method 300 discussed above. The toggle button device comprises a toggle button configured to generate an activation signal in response to a user toggling the toggle button, an indoor position module configured to determine an indoor position of the toggle button device, and a communication unit configured to, in response to the user toggling the toggle button, generate an output signal, wherein a type of output signal is dependent on the indoor position, or the output signal comprises the indoor position. The toggle button device may offer a cheaper and simpler approach to achieve a location-based privacy. Further the toggle button device 600 may facilitate home security in terms of, e.g., turn on or off a home alarm system provided the toggle button device is located on a specific location, etc. A user interface between the user and the toggle button device 600 may include a single toggle button 610. The toggle button 610 may be a physical button. Alternatively, the toggle button device 600 may comprise a touch sensitive display for displaying an icon functioning as the toggle button to be possibly updated in response to the user toggling the toggle button 610. Alternatively, the toggle button device may comprise a display and a physical button, wherein a display content may be updated in response to the user toggling the toggle button 610.

The indoor position module may comprise an ultra-wideband, UWB, module and/or a Bluetooth low energy, BLE, module. Details regarding these indoor position modules have already been discussed above. To avoid undue repetition, reference is made to the above.

The indoor position module may comprise a passive physical tag module being an RFID module and/or an NFC module. This may facilitate an easy way of determining a user position by for example placing the smart phone on such a passive physical tag to "check in" at e.g. the dinner table to automatically apply the rule associated with the dinner table, or in connection with going to bed whereby a rule may be to lock doors of the home, etc. Further details regarding these indoor position modules have already been discussed above. To avoid undue repetition, reference is made to the above.

The toggle button device may be a portable device. This may facilitate carrying the toggle button device to possibly checking in on a specific defined area for executing a rule attributed to the specific defined area, etc. Further disclosed is a toggle button system comprising a toggle button device as per the above. The toggle button system further comprises a smart home controller. The smart home controller s configured to receive the output signal generated by the toggle button device. The smart home controller is further configured to control one or more electronic devices based on the output signal. A type of output signal may depend on the indoor position. For instance, should the indoor position module be a UWB or a BLE, the output signal may comprise the indoor position. However, should the indoor position module be an RFID or an NFC module, the output signal may be digital information, e.g., a digital identification, associated with a specific RFID/NFC unit in the home, such that the smart home controller may identify the digital information with a specific position of the RFID/NFC unit. Hence, the smart home controller may determine the position of the toggle button device and control the one or more electronic devices according to the position.

The smart home controller may comprise a memory storing a plurality of rules, each rule being associated with an indoor position and comprising one or more individual settings for at least one of the one or more electronic devices. The smart home controller may further be configured to, based on the received output signal, select one of the rules from the plurality of rules, and control the one or more electronic devices as defined in the rule. The one or more individual settings may be set to control an availability of a service of the one or more electronic devices. The one or more settings is set to control a physical state of the one or more electronic devices.

Further details regarding the rule(s) have already been discussed in connection with the previously disclosed aspects and embodiments therein. Hence, when applicable, these further details may apply also for the toggle button system.

Figure 9:
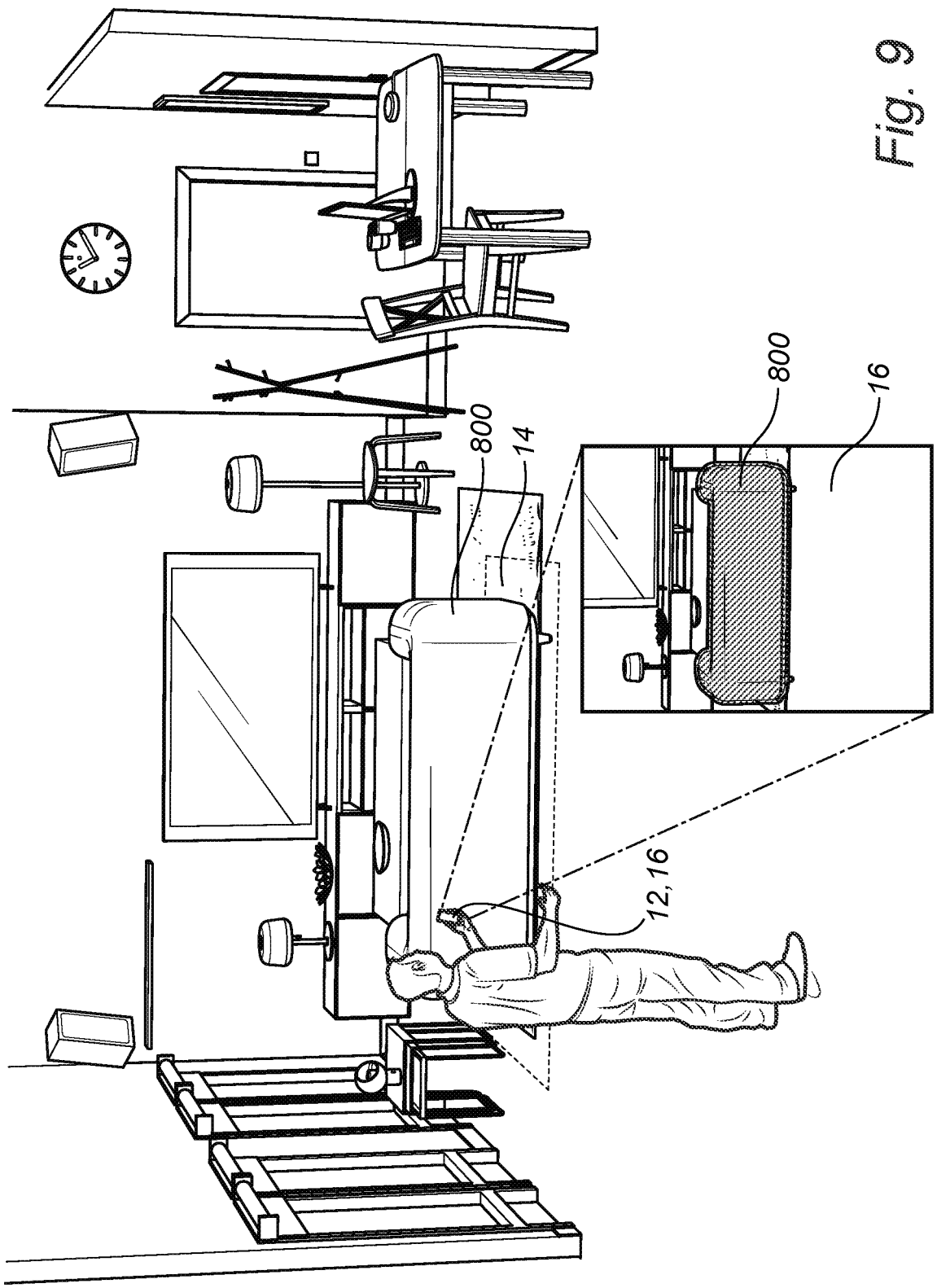
FIG. 9 shows an example of how to define an area to which a rule is attributed.

In connection with FIG. 9 there is shown an example of defining an area associated with a piece of furnishing. The real-world indoor environment herein concerns a living room, and the piece of furnishing in question is a sofa 800. A user uses a smartphone 12 by which the sofa 800 is detected by analyzing an image captured by a camera of the smartphone 12. The sofa 800 is displayed on a display 16 of the smartphone 12 in an AR or VR representation of the real-world indoor environment, i.e., the living room. The sofa 800 is highlighted on the display of the smartphone 12 by having a striped pattern in the AR or VR representation, to emphasize that a desired piece of furnishing is the piece of furnishing for which an area 14 is to be defined. Other examples of highlighting, discussed above, may be applicable. Yet again, the defined area 14 may be the area occupied by the sofa 800, i.e., a flooring area on which the sofa 800 is located. As can be seen in FIG. 9, and also discussed above, the defined area 14 herein extends outside a vertical projection of the sofa 800. For further alternatives in connection with this example, reference is made to the above, when applicable.

In connection with FIG. 10 there is shown an example use case of a computer implemented method 300 for controlling one or more electronic devices 12a, 12b, 710 in a smart home system. This example shows a plurality of humans sitting around a dinner table 700 eating dinner. Herein, as well as according to examples given above, the defined area 14 is a floor area on which the dinner table 700, at least to a certain extent, occupies. As can be seen in this example, the defined area 14 may extend outside a vertical projection of the dinner table 700, which has been discussed above. A rule attributed to the defined area 14 may be to set any smart device located in that defined area in "Silent mode" or "Airplane mode" to facilitate a location based privacy and thereby facilitate human interaction between the plurality of humans. Herein, a first 12a and a second 12b smartphone are exemplified as smart devices. A similar rule may apply for all smart devices in connection with the defined area 14. However, different smart devices may have different rules to be applied to respective smart device. Herein, the first smartphone 12a is muted, and the second smartphone 12b is set in Airplane mode during dinner to exemplify such differing rules. Further, the rule may comprise one or more individual settings for an electronic device, wherein the one or more individual settings may be set to control a physical state of the electronic device. Herein, a ceiling lamp 710 is exemplified as being an electronic device associated with a physical state being, e.g., a brightness of the ceiling lamp. Hence, the ceiling lamp may be turned on or dimmed up whenever one or more users sit around the dinner table 700. Shown is further a smart home controller 400 associated with the method 300 for detecting presence of a user and controlling an electronic device based on the detected presence. Hence, the smart home controller 400 herein detects presence of the plurality of users around the dinner table 700 occupying the defined area 14, and controls the ceiling lamp 710, the first smartphone 12a and the second smartphone 12b accordingly. Alternative embodiments in connection with this example have been discussed in the preceding text.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

Itemized List of Embodiments i. A computer implemented method 100 in a smart home system, the method 100 comprising:
defining 110, by sensing an indoor position 10 of a wearable electronic device 12 comprising an indoor positioning module, an area 14 in a real-world indoor environment,
attributing 120 a rule to the defined area 14, the rule comprising one or more settings to be applied to one or more electronic devices upon a user being detected in the defined area 14.

ii. The method 100 according to item i, wherein the step of defining 110 the area 14 comprises:
detecting a piece of furnishing 50 by analyzing an image captured by a camera of the wearable electronic device 12,
displaying, on a display 16 of the wearable electronic device 12, an augmented reality, AR, or virtual reality, VR, representation of the real-world indoor environment with the piece of furnishing 50 being highlighted, defining the area 14 as an area being occupied by the piece of furnishing 50.

iii. The method 100 according to item i, wherein defining 110 the area 14 in the real-world indoor environment comprises defining corners 70 of the area 14 by sensing positions 10 of the wearable electronic device 12 upon actuation of corner setting inputs being registered.

iv. The method 100 according to item i wherein defining 100 the area 14 in the real-world indoor environment comprises defining a center 80 of the area 14 by sensing positions 10 of the wearable electronic device 12 upon actuation of a center setting input being registered.

v. The method 100 according to item iv, further comprising at least one of:

defining an extension of the area 14 by registering an extension input, and defining a shape of the area by registering a shape input.

vi. The method 100 according to item iii or iv, further comprising:

prompting a user to define the area 14 in the real-world indoor environment by displaying an instruction on a display 16 of the wearable electronic device 12.

vii. The method 100 according to any one of items i-vi, wherein the rule further comprises a time period during which the rule is applicable.

viii. The method 100 according to any one of items i-vii, further comprising storing the defined area 14 and the rule attributed thereto in a database comprising defined areas and rules attributed thereto.

ix. The method 100 according to any one of items i-viii, wherein the one or more electronic devices comprises a plurality of electronic devices, wherein the rule comprises one or more individual settings for each electronic device of the plurality of electronic devices.

x. The method 100 according to any one of items i-ix, wherein the one or more settings is set to control an availability of a service of the one or more electronic devices.

xi. The method 100 according to any one of items i-x, wherein the rule attributed to the defined area 14 is a rule to control a router setting of a router, wherein the router setting is configured to prevent, allow or limit communication between the wearable electronic device 12 and the router.

xii. The method 100 according to any one of items i-xi, wherein the router setting is configured to prevent or allow communication between the wearable electronic device 12 and the router for a specific application of the wearable electronic device 12.

xiii. A non-transitory computer-readable storage medium having stored thereon instructions for implementing the method according to any one of items i-x, when executed on a device having processing capabilities.

xiv. A smart home controller 200 comprising circuitry 210 configured to execute:

an area defining function 212 configured to, based on an indoor position received from a wearable electronic device 12, define an area 14 in a real-world indoor environment; and a rule attributing function 214 configured to attribute a rule to the defined area 14, the rule comprising one or more settings to be applied to one or more electronic devices upon a user being detected in the defined area 14.

a). A computer implemented method 300 for controlling one or more electronic devices in a smart home system, the method 300 comprising detecting presence 310 of a user in a defined area 14 having a rule attributed thereto, the rule comprising one or more settings to be applied to the one or more electronic devices upon the user being detected in the defined area 14, controlling 320 the one or more electronic devices according to the rule in response to the detected presence of the user in the defined area 14.

b). The method 300 according to item a), wherein the one or more electronic devices comprises a plurality of electronic devices, wherein the rule comprises one or more individual settings for each electronic device of the plurality of electronic devices.

c). The method 300 according to item a) or b), wherein the one or more settings is set to control an availability of a service of the one or more electronic devices.

d). The method 300 according to any one of item a)-c), wherein the one or more settings is set to control a physical state of the one or more electronic devices.

e). The method 300 according to any one of items a)-d), further comprising detecting an activation of a toggle button device 600, wherein the act of controlling the one or more electronic devices is to be performed on a condition that the activation of the physical toggle button is detected.

f). The method 300 according to any one of items a)-e), further comprising detecting a predetermined user gesture, wherein the act of controlling the one or more electronic devices is to be performed on a condition that the predetermined user gesture is detected.

g). The method 300 according to any one of items a)-f), wherein the rule further comprises a time period during which the rule is applicable, the method further comprising determining a time stamp when the user is detected as present in the defined area 14, wherein the act of controlling is to be performed on a condition that the determined time is within the time period.

h). The method 300 according to item g), further comprising terminating the rule by setting the one or more electronic devices in a same state as prior to the time stamp.

i). The method 300 according to any one of items a)-h), wherein the act of detecting presence of the user comprises at least one of detecting an indoor position of a wearable electronic device attributed to the user, detecting a position of a physical tag attributed to the user, and monitoring the defined area by a camera.

j). The method 300 according to any one of items a)-i), further comprising terminating the rule by setting the one or more electronic devices in a same state as prior to the user was detected in the defined area.

k). A non-transitory computer-readable storage medium having stored thereon instructions for implementing the method according to any one of claims a)-j), when executed on a device having processing capabilities.

l). A smart home controller 400 comprising:
- circuitry 410 configured to execute:
  - a receiving function 412 configured to receive data indicating presence of a user in a defined area 14 in a real-world indoor environment,
  - a rule function 414 configured to check whether the defined area 14 having a rule attributed thereto, the rule comprising one or more settings to be applied to one or more electronic devices upon the user being present in the defined area 14, and
  - a control function 416 configured to, in response to a positive check whether the defined area 14 having a rule attributed thereto, generate one or more control signals comprising instructions for controlling the one or more electronic devices according to the rule; and
- a communication unit 420 configured to send the one or more control signals to the one or more electronic devices.

m). A smart home system 500 comprising:
- a presence detecting device 510 configured to detect presence of a user in a defined area 14 of a real-world indoor environment,
- a smart home controller 520 comprising:
  - circuitry 512 configured to execute:
    - a receiving function 412 configured to receive data indicating presence of a user in a defined area 14 in a real-world indoor environment,
    - a rule function 414 configured to check whether the defined area 14 having a rule attributed thereto, the rule comprising one or more settings to be applied to one or more electronic devices upon the user being present in the defined area 14, and
    - a control function 416 configured to, in response to a positive check whether the defined area 14 having a rule attributed thereto, generate one or more control signals comprising instructions for controlling the one or more electronic devices according to the rule,
  - a communication unit 514 configured to send the one or more control signals to the one or more electronic devices.

n). The smart home system 500 according to item m), wherein the presence detecting device 510 comprises at least one of:
- a tracking device configured to track a smart electronic device attributed with the user;
- a monitoring camera;
- a radar (LIDAR, mmWave);
- a pressure sensitive sensor (e.g. in carpets or furniture);
- a motion sensor;
- a temperature sensitive sensor;
- circuitry configured to execute a signal pattern determining function configured to determine a signal pattern of a signal emitted by an electronic device, wherein the signal is any one of a WiFi signal, a Bluetooth signal, and a Bluetooth low energy signal.

A). A toggle button device 600 comprising:
- a toggle button 610 configured to generate an activation signal in response to a user toggling the toggle button 610;
- an indoor position module 620 configured to determine an indoor position of the toggle button device 600;
- a communication unit 630 configured to, in response to the user toggling the toggle button 610, generate an output signal, wherein a type of output signal is dependent on the indoor position, or the output signal comprises the indoor position.

B). The toggle button device 600 according to item A), wherein the indoor position module 620 comprises an ultra-wideband, UWB, module and/or a Bluetooth low energy, BLE, module.

C). The toggle button device 600 according to item A), wherein the indoor position module 620 comprises a passive physical tag module being an RFID module and/or an NFC module and wherein the indoor position of the toggle button device is determined by reading an RFID or an NFC tag while the toggle button device is located close to the RFID or the NFC tag.

D). The toggle button device 600 according to any one of items A)-C), being a portable device.

E). A toggle button system comprising
- a toggle button device 600 according to any one of items A)-D),
- a gateway configured to
  - receive the output signal generated by the toggle button device, and
  - control one or more electronic devices based on the output signal.

F). The toggle button system, wherein the gateway comprises a memory storing a plurality of rules, each rule being associated with an indoor position and comprising one or more individual settings for at least one of the one or more electronic devices, wherein the gateway is further configured to, based on the received output signal, select one of the rules from the plurality of rules, and control the one or more electronic devices as defined in the rule.

G). The toggle button system according to item E) or F), wherein the one or more individual settings is set to control an availability of a service of the one or more electronic devices.

H). The toggle button system according to any one of item E)-G), wherein the one or more settings is set to control a physical state of the one or more electronic devices.

The invention claimed is:

1. A method implemented by a computer, the computer incorporated in a smart home system, the method comprising:
defining, by sensing an indoor position of a wearable electronic device comprising an indoor positioning module, an area in a real-world indoor environment; and
attributing a rule to the area, the rule comprising one or more settings to be applied to one or more additional electronic devices upon a user associated with the one or more additional electronic devices being detected in the area, detecting the user including determining a presence of the user in the area, and applying the settings including selectively triggering application of the rule based on the presence of the user in the area;
wherein the defining the area comprises:
(1) detecting a piece of furnishing by analyzing an image captured by a camera of the wearable electronic device or providing for user selection of the piece of furnishing, displaying, on a display of the wearable electronic device, an augmented reality, AR, or virtual reality, VR, representation of the real-world indoor environment with the piece of furnishing, and defining the area as an area being occupied by the piece of furnishing, (2) defining corners of the area by sensing positions of the wearable electronic device upon actuation of corner setting inputs being registered, or (3) defining a center of the area by sensing positions of the wearable electronic device upon actuation of a center setting input being registered.

2. The method according to claim 1, further comprising at least one of:
defining an extension of the area by registering an extension input; and
defining a shape of the area by registering a shape input.

3. The method according to claim 1, further comprising:
prompting a user to define the area in the real-world indoor environment by displaying an instruction on a display of the wearable electronic device.

4. The method according to claim 1, wherein the rule further comprises a time period during which the rule is applicable.

5. The method according to claim 1, further comprising:
storing the area and the rule attributed thereto in a database comprising defined areas and rules attributed thereto.

6. The method according to claim 1, wherein the one or more additional electronic devices comprises a plurality of electronic devices, wherein the rule comprises one or more individual settings for each electronic device of the plurality of electronic devices.

7. The method according to claim 1, wherein the one or more settings is set to control an availability of a service of the one or more additional electronic devices.

8. The method according to claim 1, wherein the rule attributed to the area is a rule to control a router setting of a router, wherein the router setting is configured to prevent, allow, or limit communication between the wearable electronic device and the router.

9. The method according to claim 8, wherein the router setting is configured to prevent or allow communication between the wearable electronic device and the router for a specific application of the wearable electronic device.

10. A non-transitory computer-readable storage medium having instructions stored thereon which, when executed on a processor, causes the processor to:
define, by sensing an indoor position of a wearable electronic device comprising an indoor positioning module, an area in a real-world indoor environment; and
attribute a rule to the area, the rule comprising one or more settings to be applied to one or more additional electronic devices upon a user being detected in the area, detecting the user including determining a presence of the user in the area, and applying the settings including selectively triggering application of the rule based on the presence of the user in the area;
wherein defining the area in the real-world indoor environment comprises:
(1) detecting a piece of furnishing by analyzing an image captured by a camera of the wearable electronic device or providing for user selection of the piece of furnishings, displaying, on a display of the wearable electronic-device, an augmented reality, AR, or virtual reality, VR, representation of the real-world indoor environment with the piece of furnishing, and defining the area as an area being occupied by the piece of furnishing,
(2) defining corners of the area by sensing positions of the wearable electronic device upon actuation of corner setting inputs being registered, or
(3) defining a center of the area by sensing positions of the wearable electronic device upon actuation of a center setting input being registered.

11. A smart home controller comprising circuitry configured to execute:
an area defining function configured to, based on an indoor position received from a wearable electronic device, define an area in a real-world indoor environment; and
a rule attributing function configured to attribute a rule to the area, the rule comprising one or more settings to be applied to one or more additional electronic devices upon a user being detected in the area, detecting the user including determining a presence of the user in the area, and applying the settings including selectively triggering application of the rule based on the presence of the user in the area;
wherein the area defining function is configured to define the area by:
(1) detecting a furnishing by analyzing an image captured by a camera of the wearable electronic device or providing for user selection of the furnishing, displaying, on a display of the wearable electronic device, an augmented reality, AR, or virtual reality, VR, representation of the real-world indoor environment with the furnishing, and defining the area as an area being occupied by the furnishing,
(2) defining corners of the area by sensing positions of the wearable electronic device upon actuation of corner setting inputs being registered, or
(3) defining a center of the area by sensing positions of the wearable electronic device upon actuation of a center setting input being registered.

12. The smart home controller of claim 11, wherein the rule further comprises a time period during which the rule is applicable.

13. The smart home controller of claim 11, wherein the one or more additional electronic devices comprises a plurality of electronic devices, wherein the rule comprises one or more individual settings for each electronic device of the plurality of electronic devices.

14. The smart home controller of claim 11, wherein the rule attributed to the area is a rule to control a router setting of a router, wherein the router setting is configured to prevent, allow, or limit communication between the wearable electronic device and the router.

15. A method comprising:
operating one or more modules of a smart home system, the smart home system including a wearable electronic device, the one or more modules configured to cause the wearable electronic device to perform operations for taking a digital image of a setting and generating a spatial representation of the setting based on the digital image;
determining, by the wearable electronic device, a position of the wearable electronic device relative to the setting and an area surrounding a furnishing in the setting, determining including defining the area by sensing one or more positions of the wearable electronic device relative to the furnishing and interpolating, using a least square method, a plurality of points representative of the area for estimating a perimeter of the area; and
attributing, by the wearable electronic device, a rule to the area, the rule comprising one or more settings to be applied to one or more additional devices associated with a user of the wearable electronic device upon detection of the one or more additional devices being positioned inside the perimeter of the area, wherein:

detection of the one or more additional devices inside the perimeter of the area includes detecting a presence of the one or more additional devices inside the perimeter of the area and determining a change in the presence of the one or more additional devices inside the perimeter of the area; and occurrence of the change in the presence of the one or more additional devices inside the perimeter of the area causes selective application of the rule.

\* \* \* \* \*